Aug. 5, 1924.
H. W. RUBY
CUT-OUT OPERATOR
Filed Jan. 14, 1921
1,503,918
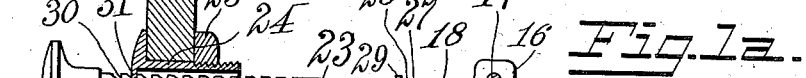
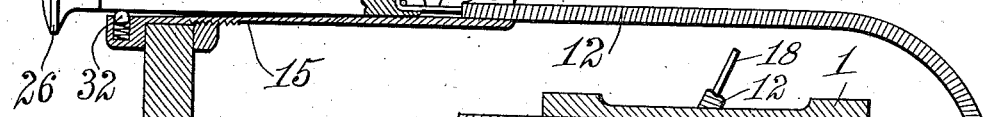
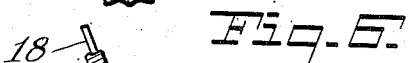
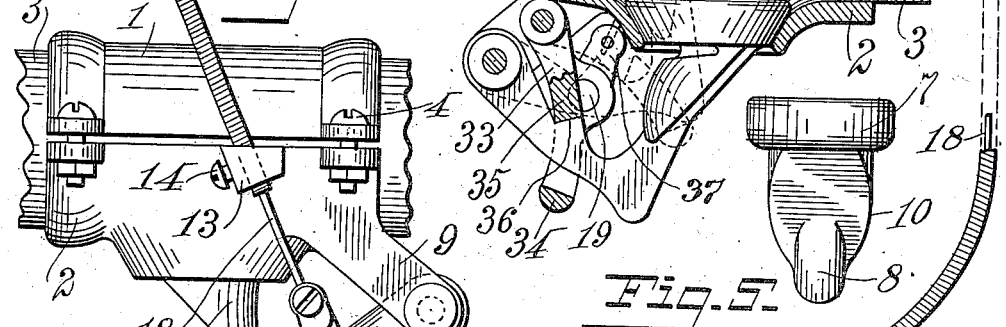
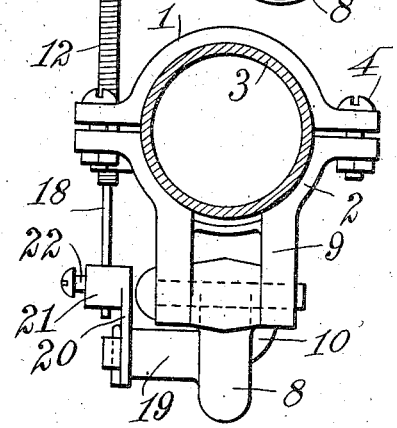
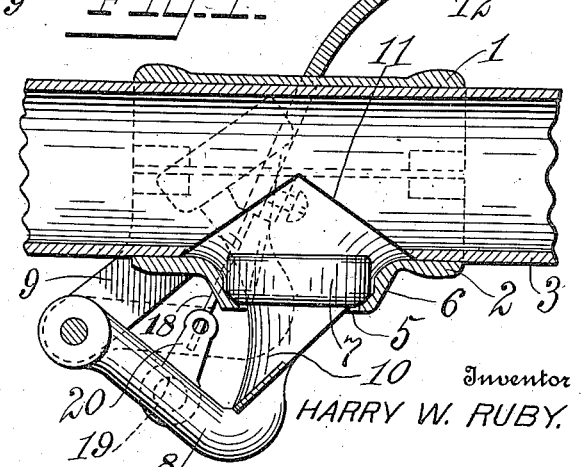
Inventor
HARRY W. RUBY.
By Edward Reed
Attorney

UNITED STATES PATENT OFFICE.

HARRY W. RUBY, OF SPRINGFIELD, OHIO.

CUT-OUT OPERATOR.

Application filed January 14, 1921. Serial No. 437,275.

*To all whom it may concern:*

Be it known that I, HARRY W. RUBY, a citizen of the United States, residing at Springfield, in the county of Clark and State of Ohio, have invented certain new and useful Improvements in Cut-Out Operators, of which the following is a specification, reference being had therein to the accompanying drawing.

This invention relates to a cut-out for the exhaust of an internal combustion engine and more particularly to the valve operating mechanism forming a part of such a cut-out.

In cut-outs of this character the valve is usually held in its closed position by springs which must be powerful enough to prevent the valve from rattling or chattering, due either to the vibration of the vehicle or to the action of the gases in the exhaust pipe, and to open the valve the tension of these powerful springs must be overcome. The operating mechanisms which have been heretofore provided for the valves have, for the most part, been of such a character that they must be mounted in certain predetermined relation to the body of the cut-out and the exact adjustment thus required has made it very difficult, and in many cases impossible, to apply the same cut-out to different makes of automobiles, or to mount the actuating device in different positions on automobiles of the same make. One object of the present invention is to provide a cut-out comprising an operating mechanism which can be installed without exact adjustment of the parts relatively one to the other, thus enabling the same to be mounted on cars of different makes or in different positions on cars of the same make, and to be operated in a satisfactory manner when so mounted.

A further object of the invention is to provide a cut-out having an operating mechanism of such a character that little or no strain will be imposed upon the exhaust pipe through the operation of the valve, thus avoiding the severe strains imposed upon the exhaust pipe in overcoming the tension of the springs usually employed to hold the valves in their closed positions.

Other objects of the invention will appear as the mechanism is described in detail.

In the accompanying drawings Fig. 1 is a longitudinal sectional view of the body portion of a cut-out embodying my invention; Fig. 1ª is a longitudinal sectional view of the actuating device forming a part of the cut-out, showing the same as connected with the valve of Fig. 1; Fig. 2 is a side elevation of the body portion of the valve; Fig. 3 is an end elevation of the same; Fig. 4 is a plan view of the actuating device; Fig. 5 is an end elevation of the valve; and Fig. 6 is a longitudinal section of the body portion of the cut-out, showing a modified form of the valve control.

In these drawings I have illustrated one embodiment of my invention, together with a slight modification thereof, and have shown the same as applied to a cut-out similar in its general features of construction to that shown and described in the application for patent filed by me Oct. 30, 1920, Serial No. 420,609. It will be understood, however, that this particular form of cut-out has been chosen for the purpose of illustration only and while it cooperates in an advantageous manner with the operating mechanism it is not essential to the use of the operating mechanism and the latter may be embodied with cut-outs of various kinds.

That form of the cut-out here illustrated comprises a body portion consisting of an upper part 1 and a lower part 2, the two parts being adapted to embrace an exhaust pipe 3 and to be clamped onto the same by bolts 4. The lower part of the body has an outlet, or cut-out opening, 5 which is surrounded by an annular flange 6 forming a seat for a valve 7 which opens inwardly and which is provided with an angular stem 8 extending downwardly and then rearwardly and pivotally mounted in its rear end between lugs 9 depending from the part 2 of the body of the cut-out. That portion of the valve stem adjacent to the body of the valve is preferably widened, as shown at 10 so that this widened portion of the stem, together with the body of the valve, will practically close the passage through the exhaust pipe, when the valve is in its open position, and will deflect substantially all the gases through the cut-out opening. The cut-out opening may communicate with the interior of the exhaust pipe in any suitable manner which will permit the valve to enter the exhaust pipe when in its open position, but I prefer to apply the cut-out to the pipe without severing the latter and the construction here shown permits the communication to be established by merely forming an opening in the lower portion of the pipe, as shown at 11, which opening registers with the outlet opening of the cut-out.

The operating mechanism, as here shown, comprises a flexible rod connected at one end with the valve and at the other end with an actuating device and mounted in a tubular guideway which prevents the rod from buckling and enables either a pull or a thrust to be exerted upon the valve, as may be desired. Preferably, but not necessarily, the tubular guideway is in the form of a flexible tube, as shown at 12, which need not be longitudinally extensible, although such extensibility would not defeat its purpose. This tube is anchored at one end on a fixed support adjacent to the body of the cut-out and in the present instance one part of the cut-out, preferably the lower part 2, is provided with a lug 13 having an opening to receive the end of the tube 12 and having means, such as a set screw 14, to rigidly secure the end of the tube in the lug. The opposite end of the tubular guideway is anchored to a fixed support at a point remote from the body of the cut-out and this point of support may be arranged in any desired position with relation to the body of the cut-out without interfering with the operation of the mechanism. As here shown, the end of the tube is anchored to the fixed member 15 of an actuating device, the latter being provided at one end with clamping lugs 16 to receive the end of the tube 12 and having a screw 17 by means of which the lugs may be clamped in engagement with the tube. Mounted within the tubular guideway is a flexible actuating rod 18, one end of which extends beyond the lower end of the tubular guideway at 2 and is operatively connected with the valve 7. Any suitable form of connection may be employed but as the distance between the end of the tubular guideway and the point of connection of the rod with the valve is usually short it is preferable that the connection be of such a character that it will not be necessary to bend the rod as this would cause more or less binding of the rod in the end of the guideway and would render the operation somewhat difficult. I have, therefore, shown the valve stem 8 as provided with a laterally extending stud 19 arranged substantially in line with the lower end of the tubular guideway 12. The rod may be connected directly with this stud but the movement of the stem about its axis would tend to bend the rod and I have, therefore, interposed between the rod and the valve stem a movable connecting device which is in the form of an arm 20 pivotally mounted on the end of the stud 19 and having its outer end rigidly connected with the end of the flexible rod 18, preferably by extending the rod 18 through an opening in a laterally offset portion 21 of the arm 20 and fastening the same therein by means of a set screw 22. This form of connection permits the flexible rod to exert a pull or thrust upon the valve stem regardless of the position of the latter and eliminates all binding of the rod at the end of the guideway.

The opposite end of the flexible actuating rod 18 is connected with a suitable actuating device which may be of any suitable character, but which preferably comprises means for locking the rod in its adjusted position and, as here shown, it is of such a character that it may be mounted upon the dash or instrument board of an automobile. To this end it comprises the fixed member 15 which constitutes a guideway for a plunger 23 and is provided with a tubular portion 24 adapted to extend through the dash or instrument board and having its end portion screw threaded to receive a nut 25 for securing it in position. The plunger 23 is provided at its outer end with a knob, or handle, 26 by means of which it may be manipulated, and has at its inner end suitable means for connecting the same with the rod 18. In the construction here shown the inner end of the plunger has a longitudinal slot 27 extending partially through the same and provided with openings to receive a cotter pin 28. The end of the flexible rod 18 is bent at an angle to the length thereof, as shown at 29, and is then placed in the slot 27 and the cotter pin inserted in the opening in the end of the plunger in front of the bent portion of the rod, thus firmly securing the latter to the plunger. In order that the plunger may be held in its adjusted positions I have provided the same along its upper edge with a series of teeth 30 adapted to engage a detent, or fixed edge, 31 at the outer end of the tubular portion 24 of the fixed member 15. The plunger is moved toward the detent 31 by means of a spring-pressed ball 32 which holds the teeth normally in engagement with the detent but enables the same to be released therefrom by a downward pressure on the knob 26.

It will be apparent from the foregoing description that the actuating device may be mounted in any suitable relation to the body of the cut-out because the tube 12 will accommodate itself to such position and may be bent or turned in various ways to avoid intervening parts of the automobile mechanism or frame structure, without interfering with the operation of the flexible rod. The rod itself is, of course, prevented from buckling by its confinement within the tube and a thrust, or pull, thereon will impart longitudinal movement only thereto and will, consequently, be exerted to its full extent upon the valve, thus enabling the valve to be positively moved in either direction by the actuating device and further enabling the valve to be thrust firmly against its seat and held in that position by the actuating device and rod. It will further be noted that the thrust of the rod is directly upon the valve and that very little or no strain of any kind is imposed upon the body of the cut-out from which it would be transmitted to the exhaust pipe, thereby tending to loosen the same in its mountings and to cause leakage and rattling.

Ordinarily, the valve will be held firmly on its seat by the action of the actuating device and the connecting rod but, if desired, a separate locking device may be provided for holding the valve in its closed position and I have shown such a device in Fig. 6. As there shown the cut-out mechanism and valve are similar to those shown in the other figures, but the actuating rod 18 is not connected directly with the valve stem 8 but is connected therewith through the medium of a locking device which is here shown as an arm 33 pivotally mounted on the lugs 9 and having its lower end extending beneath and transversely to the rearwardly extending portion of the valve stem 8, as shown at 34, and having an intermediate portion, 35, extending transversely above the rearwardly extending portion of the valve stem and arranged to engage a shoulder 36 formed on the upper edge of the valve stem. The part 35 of the locking arm and the shoulder 36 of the stem are so arranged that the part 35 can engage the shoulder only when the valve is in its seated position and will then hold the valve in that position. The flexible rod 18 is connected with the locking arm preferably through the medium of a pivoted connecting member 37, similar to the member 20 above described. Consequently, when a pull is exerted upon the rod 18 the part 34 of the locking arm will engage the valve stem and move the valve into its open position, it being noted that the part 34 is normally arranged at such a distance from the stem that it will not engage the same until the part 35 has been moved out of line with the shoulder 36. When a downward thrust is exerted upon the actuating rod 18 the locking arm will be moved downwardly and the valve will move downwardly under its own weight, or will be forced downwardly by the action of the locking arm and when the valve has been seated the portion, or lug 35 of the arm will engage the shoulder 36 and lock the valve against its seat. In this form of the device I have provided a double lock for the valve, the same being held in its closed position not only by the locking of the rod 18 against upward movement but also by the lug on the locking arm.

While I have shown and described one embodiment of my invention, together with a slight modification thereof, I wish it to be understood that I do not desire to be limited to the details thereof as various modifications may occur to a person skilled in the art.

Having now fully described my invention what I claim as new and desire to secure by Letters Patent is:

1. In a cut-out of the character described, the combination with a body portion adapted to be supported by the exhaust pipe of an internal combustion engine and having a cut-out opening to communicate with the interior of said exhaust pipe, said opening being provided with a valve seat, and a valve movable into and out of engagement with said valve seat to control the communication of said opening with said exhaust pipe, of an operating device comprising a fixed guideway, a flexible rod slidably mounted in said guideway, and an arm connected with one end of said rod and pivotally connected with said valve, said arm and its axis being arranged substantially in line with said rod to cause said rod to exert a direct thrust on said valve in any position of the latter.

2. In a cut-out of the character described, the combination with a body portion adapted to be supported by the exhaust pipe of an internal combustion engine and having a cut-out opening to communicate with the interior of said exhaust pipe, said opening being provided with a valve seat, a valve movable into and out of engagement with said valve seat to control the communication between said opening and said exhaust pipe, and a stem connected with said valve and pivotally mounted exteriorly of said body portion and arranged to move said valve into said exhaust pipe when said stem is moved in one direction, of an operating device comprising a fixed guideway, a flexible rod mounted in said guideway and an arm pivotally connected with said stem and connected with said rod, said arm and its axis being arranged substantially in line with said rod.

In testimony whereof, I affix my signature hereto.

HARRY W. RUBY.